(12) United States Patent
Olechnowicz et al.

(10) Patent No.: US 9,188,463 B2
(45) Date of Patent: Nov. 17, 2015

(54) HERMETIC ELECTRICALLY SHIELDED CONNECTOR

(71) Applicant: General Electric Company, Schenectady, NY (US)

(72) Inventors: Benjamin John Olechnowicz, Stow, OH (US); Frederick Louis Glesius, Brecksville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 293 days.

(21) Appl. No.: 13/759,188

(22) Filed: Feb. 5, 2013

(65) Prior Publication Data
US 2014/0216155 A1    Aug. 7, 2014

(51) Int. Cl.
*G01D 11/24* (2006.01)

(52) U.S. Cl.
CPC ......... *G01D 11/245* (2013.01); *Y10T 29/49947* (2015.01)

(58) Field of Classification Search
CPC ..... G01D 11/24; G01D 11/245; G01D 11/26; H02B 1/28; H02G 3/22; H05K 5/06; H05K 5/069; Y10T 29/49947
See application file for complete search history.

(56) References Cited

U.S. PATENT DOCUMENTS

| | | | | |
|---|---|---|---|---|
| 2,730,686 | A * | 1/1956 | Smiley | 439/320 |
| 3,880,453 | A * | 4/1975 | Philibert et al. | 285/151.1 |
| 4,997,391 | A * | 3/1991 | Federico et al. | 439/580 |
| 5,239,129 | A * | 8/1993 | Ehrenfels | 174/51 |
| 5,302,138 | A * | 4/1994 | Shields | 439/527 |
| 5,318,459 | A * | 6/1994 | Shields | 439/527 |
| 5,321,205 | A * | 6/1994 | Bawa et al. | 174/655 |
| 5,408,740 | A * | 4/1995 | Dee | 29/887 |
| 5,704,400 | A * | 1/1998 | Eldridge | 138/96 T |
| 6,433,275 | B1 * | 8/2002 | Rittmann et al. | 174/50.56 |
| 7,048,561 | B1 * | 5/2006 | Elbaz | 439/271 |
| 8,513,543 | B1 * | 8/2013 | Lin | 174/656 |
| 8,672,428 | B2 * | 3/2014 | Takeuchi et al. | 312/222 |
| 2005/0085125 | A1 * | 4/2005 | Montena | 439/578 |
| 2009/0174154 | A1 * | 7/2009 | Chiu | 277/603 |
| 2011/0259637 | A1 * | 10/2011 | Winship | 174/667 |
| 2012/0036929 | A1 * | 2/2012 | Fujita et al. | 73/431 |
| 2012/0081847 | A1 * | 4/2012 | Watanabe et al. | 361/679.01 |
| 2013/0273483 | A1 * | 10/2013 | Spalding et al. | 431/79 |
| 2013/0318994 | A1 * | 12/2013 | Hoffman et al. | 60/779 |
| 2014/0124260 | A1 * | 5/2014 | Blakemore et al. | 174/652 |
| 2014/0167757 | A1 * | 6/2014 | Laskaris et al. | 324/322 |
| 2014/0260712 | A1 * | 9/2014 | Damren et al. | 73/866.5 |

* cited by examiner

*Primary Examiner* — Peter Macchiarolo
*Assistant Examiner* — Natalie Huls
(74) *Attorney, Agent, or Firm* — Cooper Legal Group, LLC

(57) ABSTRACT

A sensor apparatus is used for sensing a condition in a combustion chamber. The sensor apparatus includes a sensor housing having a sealed internal chamber. The sensor apparatus further includes a connector attached to an opening of the sensor housing. The connector transfers a signal indicative of the condition into the sensor housing. A fastener is secured to the connector. A sealing member is disposed between the connector and the fastener. The sealing member sealingly engages the connector to prevent fluid passage through the connector and into the internal chamber of the sensor housing. A method of sealing a sensor apparatus is also provided.

20 Claims, 6 Drawing Sheets

HERMETIC ELECTRICALLY SHIELDED CONNECTOR

BACKGROUND OF THE INVENTION

1. Field of the Invention

The invention relates to a flame sensor and, more particularly, to a flame sensor having a sealed housing.

2. Discussion of the Prior Art

Within an oil or gas fueled turbine, fuel is fed into a combustion chamber within which an ignition flame is present. If the flame becomes extinguished, commonly referred to as a flame-out condition, it is undesirable for fuel to continue to be fed into the hot combustion chamber without appropriate ignition. A flame sensor is generally used for detecting the presence or absence of an ignition flame within a combustion chamber of a gas turbine. Flame sensing electronics are commonly associated with the flame sensor and may be exposed to a wide range of temperatures, such as in the range of 25° Celsius (77° Fahrenheit) to about 150° Celsius (302° Fahrenheit). Due to these temperature fluctuations, a housing that houses the flame sensing electronics will exhibit thermal expansion, causing leakage and allowing for the ingress of moisture. This moisture adversely affects the flame sensing electronics and, thus, reduces the accuracy of the flame sensor.

Accordingly, it would be useful to provide a flame sensor having a sealed housing that limits moisture from entering and affecting the flame sensing electronics at elevated temperatures.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a sensor apparatus for sensing a condition in a combustion chamber. The sensor apparatus includes a sensor housing having a sealed internal chamber. The sensor apparatus further includes a connector attached to an opening of the sensor housing. The connector transfers a signal indicative of the condition into the sensor housing. A fastener is secured to the connector. A sealing member is disposed between the connector and the fastener. The sealing member sealingly engages the connector to prevent fluid passage through the connector and into the internal chamber of the sensor housing.

In accordance with another aspect, the present invention provides a sensor apparatus for sensing a condition. The sensor apparatus includes a sensor housing having a sealed internal chamber. A connector is attached to the sensor housing and extends at least partially into the internal chamber of the sensor housing. A fastener is secured to the connector. The fastener includes an internal bore that is sized to receive the connector. A sealing member is positioned within the internal bore of the fastener. The sealing member is compressed by the fastener into a sealing engagement with the connector to prevent fluid passage through the connector and into the internal chamber of the sensor housing.

In accordance with another aspect, the present invention provides a method of sealing a sensor apparatus. The method includes the steps of providing a sensor housing having a sealed internal chamber. The method further includes the step of positioning a connector to extend at least partially into the internal chamber of the sensor housing. The method further includes the step of attaching a fastener to the connector such that the connector is received within an internal bore of the fastener. The method further includes the step of compressing a sealing member between the fastener and the connector such that the sealing member forms a seal with the connector and prevents fluid passage through the connector and into the internal chamber of the sensor housing.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
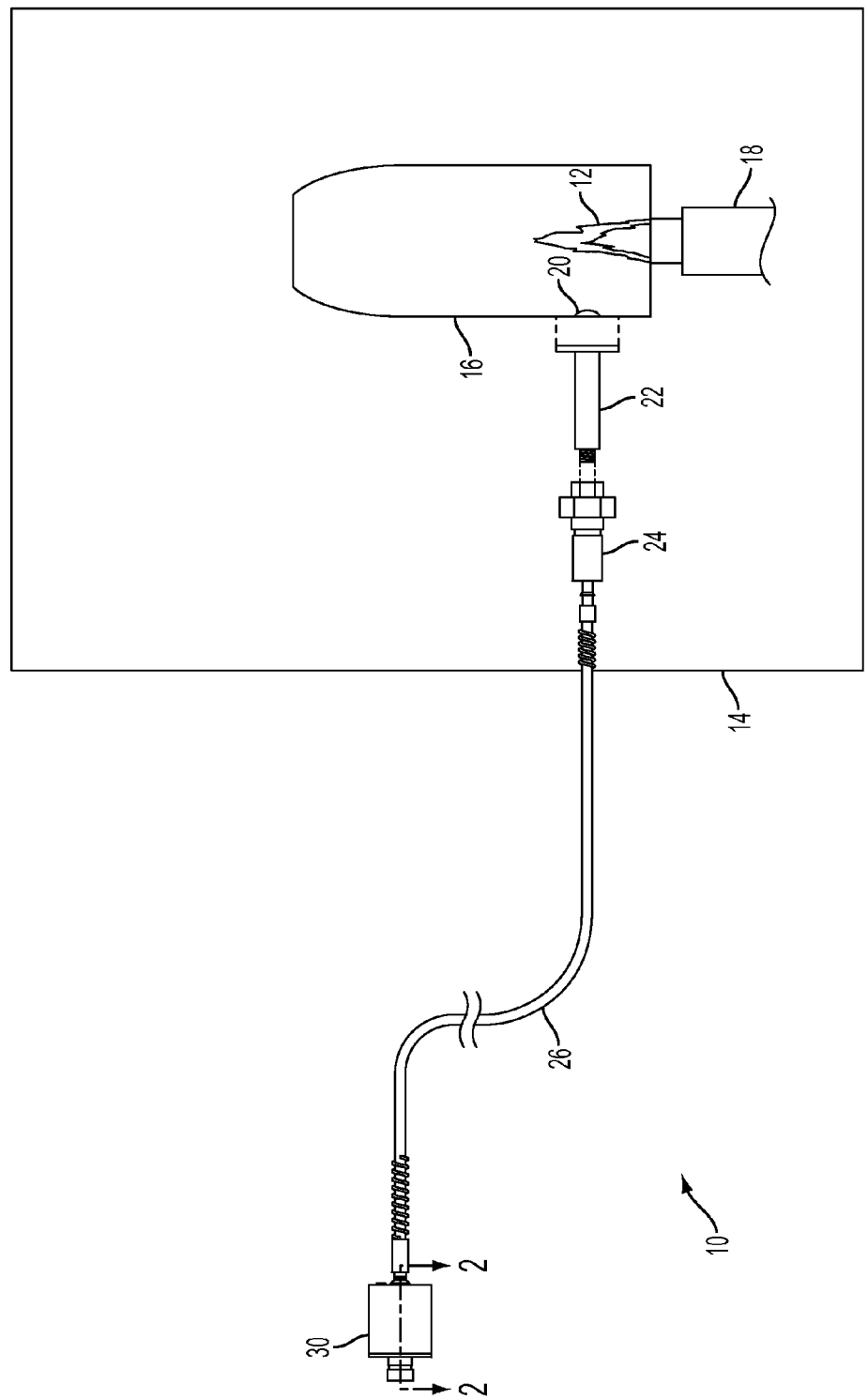
FIG. 1 is a partially exploded, schematized cross-section view of an example flame sensor apparatus in accordance with at least one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 schematically illustrates an example sensor apparatus 10 for monitoring characteristics of a flame 12. The flame 12 is located within a combustion chamber 16 of a turbine 14 and emits electromagnetic radiation energy. The turbine 14 can include rotating turbine blades (not shown) powered by fuel combustion within the combustion chamber 16. The turbine 14 is generically/schematically shown in FIG. 1 to convey the concept that the turbine 14 can include a number of different structures and/or could be used in varied, different applications. For example, the turbine 14 could be constructed/configured for oil and gas combustion turbines and used in applications such as for aircraft propulsion, marine propulsion, land-based power generation, off shore power generation, or the like. In one particular example, the turbine 14 and sensor apparatus 10 can be used in jet aircraft engines. As such, it is to be appreciated that the turbine 14 in FIG. 1 is not intended to be limiting on further examples.

The combustion chamber 16 is positioned within the turbine 14. The combustion chamber 16 defines a substantially hollow internal area. It is to be understood that the combustion chamber 16 is generically/schematically represented in FIG. 1, and is not intended to be limiting on further examples. For instance, the generic representation of the combustion chamber 16 is intended to convey the concept that the combustion chamber 16 can represent a number of different constructions, some of which may be generally known. Similarly, the combustion chamber 16 described herein and as in association with the turbine 14 discussed above may be incorporated into a number of different applications.

A fuel nozzle 18 is provided to deliver fuel (e.g., air, fuel, air/fuel mixture, combustible materials, etc.) into the combustion chamber 16. The fuel nozzle 18 can cooperate with an opening, orifice, or the like in the combustion chamber 16 such that the fuel nozzle 18 can deliver the fuel from an exterior location into the combustion chamber 16. As such, the fuel nozzle 18 can deliver the fuel into the combustion chamber, whereupon the fuel can be ignited with the flame 12. Ignited fuel within the combustion chamber 16 produces a relatively high-pressure gas.

An opening 20 is provided in an outer wall of the combustion chamber 16. The opening 20, extends completely through the outer wall. As such, an interior of the combustion chamber 16 is optically exposed to a location that is exterior from the combustion chamber 16. The opening 20 can be positioned in near proximity to the flame 12, such that the opening 20 defines an optical path through the opening 20 and towards the flame 12.

A sight tube 22 is located in the optical path from the flame 12 and through the opening 20. FIG. 1 depicts an exploded view of the sight tube 22 for illustrative purposes to show the structural relationship between the sight tube 22 and the opening 20. It is to be understood, however, that in operation, the sight tube 22 and combustion chamber 16 are in a fully assembled state with the sight tube 22 attached to the combustion chamber 16. The sight tube 22 is attached to the combustion chamber 16 in any number of ways, such as by mechanical fasteners, welding, adhesives, or the like.

The sensor apparatus 10 further includes a probe assembly 24. The probe assembly 24 is attached to the sight tube 22. In the shown example, the probe assembly 24 is depicted in an exploded state (i.e., probe assembly 24 detached from the sight tube 22). However, in operation, the probe assembly 24 is in a fully assembled state by being attached to the sight tube 22. In one example, the probe assembly 24 houses a photodiode or other similar photodetecting device that converts light energy into current or voltage. In such an example, the photodiode will receive electromagnetic radiation from the flame 12 and through the sight tube 22. The photodiode will then generate a current output signal, such as a photocurrent, based on this electromagnetic radiation energy.

The sensor apparatus 10 further includes a cable assembly 26 in attachment with the probe assembly 24. The cable assembly 26 includes, for example, a wire, a coaxial cable, a triaxial cable, a fiber optic cable, etc. In one particular example, the cable assembly 26 will receive the photocurrent from the probe assembly 24 and transmit the photocurrent. For instance, the cable assembly 26 will transmit the photocurrent from one end of the cable assembly 26 to an opposing second end. It is to be appreciated that the cable assembly 26 may include any number of dimensions, such as by being longer or shorter than as shown.

The sensor apparatus 10 further includes a sensor housing 30 attached to the cable assembly 26 opposite the probe assembly 24. The sensor housing 30 receives the photocurrent from the cable assembly 26. The sensor housing 30 is positioned outside of the turbine 14 and spaced a distance apart from the combustion chamber 16. Accordingly, the sensor housing 30 can be positioned in a location that has a lower temperature than within the turbine 14, such that electronics can be used in the sensor housing 30 without being subjected to relatively high temperatures.

Figure 2:
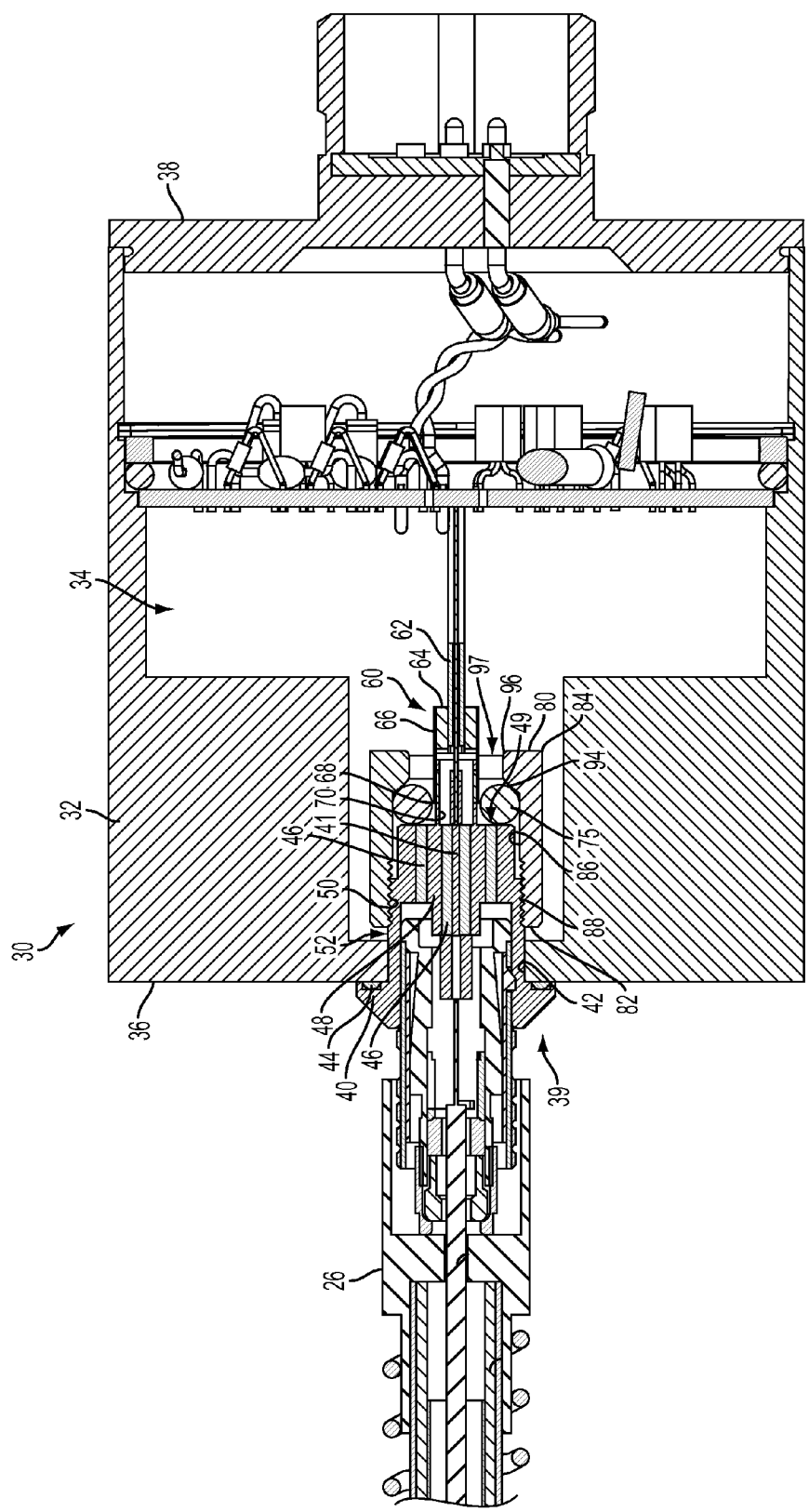
FIG. 2 is an enlarged, reverse-angle sectional view of an example sensor housing of the flame sensor apparatus of FIG. 1 including an example connecting assembly in a partially attached state with respect to the sensor housing.

Turning now to FIG. 2, an enlarged, reverse-angle sectional view along lines 2-2 of FIG. 1 is shown, depicting an example of the sensor housing 30. The sensor housing 30 includes a housing body 32. The housing body 32 defines an internal chamber 34 that is substantially hollow. The housing body 32 extends between a first end 36 and an opposing second end 38. It is to be appreciated that the sensor housing 30 shown in FIG. 2 includes only one possible construction, as a number of sizes, shapes, and configurations are envisioned. For example, the housing body 32 could have a larger or smaller cross-sectional size (e.g., diameter, etc.) than as shown. Likewise, the housing body 32 could be longer or shorter in length than depicted.

The sensor apparatus 10 further includes a connecting assembly 39 for connecting the sensor housing 30 with respect to the cable assembly 26. The connecting assembly 39 is attached to the cable assembly 26 such that the current output signal is received from the cable assembly 26. Further, the connecting assembly 39 is sealingly attached to the sensor housing 30 to limit the passage of environmental effects (e.g., moisture/water, air, gas, debris, etc.) into the sensor housing 30. By sealing the sensor housing 30, the connecting assembly 39 will limit/prevent environmental effects from adversely affecting the relatively sensitive electronics housed within the sensor housing 30.

The connecting assembly 39 includes a connector 40 that is attached to the first end 36 of the sensor housing 30. The connector 40 is attached (e.g., electrically connected) to the cable assembly 26. The connector 40 includes a wire lead 41 (e.g., conductor, cable, etc.) extending axially through a center of the connector 40. The wire lead 41 is electrically connected to the cable assembly 26 such that the wire lead 41 will receive the current output signal, such as the photocurrent indicative of the electromagnetic radiation energy, from the cable assembly 26. The wire lead 41 passes through the connector 40 and into the internal chamber 34 of the sensor housing 30. The wire lead 41 can further be attached (e.g., electrically connected) to a circuit board (as shown) or other electronics within the sensor housing 30.

The connector 40 extends through an opening 42 in the housing body 32 of the sensor housing 30. In one example, the opening 42 has a cross-sectional size and shape that substantially matches a cross-sectional size and shape of the connector 40. For example, the opening 42 can have a generally circular cross-sectional shape that matches a circular shape of the connector 40, though other shapes are envisioned. The opening 42 may be slightly larger in size so as to receive the connector 40 while limiting movement of the connector 40 with respect to the opening 42.

The connector 40 further includes a housing seal 44 for forming a seal with the housing body 32. The housing seal 44 has a cross-sectional size that is larger than the opening 42. The housing seal 44 is positioned between a portion of the connector 40 and an outer surface of the housing body 32. In this example, the housing seal 44 extends circumferentially around the opening 42. The housing seal 44 is compressed so as to sealingly engage each of the connector 40 and the housing body 32, so as to limit the ingress/egress of fluids (e.g., air, moisture, gas, etc.) into and out of the internal chamber 34.

The connector 40 further includes one or more potting layers 46. The potting layers 46 each extend longitudinally at least partially along the length of the connector 40. The potting layers 46 each include a potting material, such as epoxy and/or silicon, though other electrically insulating materials are also envisioned. The potting layers 46 extend circumferentially around the wire lead 41 and are radially spaced apart from each other. The potting layers 46 can form a seal to limit the ingress/egress of fluids (air, moisture, gas, etc.) into and out of the internal chamber 34. In the shown example, the potting layers 46 have different lengths, with each of the potting layers 46 extending generally to an end surface 49 of the connector 40. Of course, in other examples, the potting layers 46 could extend a longer or shorter distance than as shown.

The connector 40 further includes one or more grounding layers 48. The grounding layers 48 each extend longitudinally at least partially along the length of the connector 40. The grounding layers 48 are each electrically grounded and extend circumferentially around the wire lead 41. In this example, the grounding layers 48 are radially spaced apart from each other and separate adjacent potting layers 46. The grounding layers 48 limit short circuits and other electrical issues that may adversely affect the transfer of the current output signal, such as the photocurrent, through the wire lead 41. The grounding layers 48 may also be adhered to the potting layers 46 to form a seal and limit/reduce the passage of fluids through the connector 40. In the shown example, the grounding layers 48 extend generally to the end surface 49 of the connector 40. In other examples, the grounding layers 48 could extend a longer or shorter distance than as shown.

The connector 40 has a threaded portion 50 or other similar attachment structure located at an outer surface 52 of the connector 40. In the shown example, the threaded portion 50 is positioned at the outer surface 52 of the connector 40 at a location within the internal chamber 34 of the sensor housing 30. The threaded portion 50 extends at least partially along the length of the connector 40, with the threaded portion 50 forming a male threading in this example.

The connecting assembly 39 further includes a second connector 60 attached with respect to the connector 40. In the shown example, the second connector 60 is positioned within the internal chamber 34 of the sensor housing 30. The second connector 60 is attached to the end of the connector 40. In the shown example, the second connector 60 extends longitudinally in a direction away from the connector 40.

The second connector 60 may be commonly known as a metal/ceramic/metal (m/c/m) connector. In this example, the second connector 60 includes a wire housing 62. The wire housing 62 includes a substantially hollow bore through which the wire lead 41 extends. The wire housing 62 forms a seal with the wire lead 41, such that fluids (e.g., air, gas, moisture, etc.) are limited from passing through the hollow bore of the wire housing 62. In some examples, the wire housing 62 is crimped, soldered, brazed, welded, sealed, mechanically pinched, etc. to the wire lead 41 to limit the passage of fluids. Further, the wire housing 62 can have a relatively small cross-sectional size such that the wire lead 41 forms a tight fit with the wire housing 62. The wire housing 62 can be formed of any number of materials, such as metals or the like.

The second connector 60 further includes an insulating layer 64. The insulating layer 64 circumferentially surrounds a portion of the wire housing 62. The insulating layer 64 extends coaxially with the wire housing 62 and the wire lead 41 at least partially along the length of the wire housing 62. The insulating layer 64 includes any number of non-conductive materials that limit current flow between an exterior source and the wire lead 41. The insulating layer 64 includes, for example, a ceramic material or the like. In one example, the insulating layer 64 is bonded to the wire housing 62 so as to limit the passage of fluids between the insulating layer 64 and the wire housing 62.

The second connector 60 further includes a grounding layer 66. The grounding layer 66 circumferentially surrounds the insulating layer 64. The grounding layer 66 extends generally coaxially with the wire housing 62 and the insulating layer 64 at least partially along the length of the second connector 60. The grounding layer 66 includes any number of materials, including a brazed alloy such as nickel, or the like. The grounding layer 66 is bonded to the insulating layer 64 to limit the passage of fluids between the grounding layer 66 and the insulating layer 64.

A first end 68 of the grounding layer 66 is attached to an outlet tube 70 of the connector 40. The grounding layer 66 can have a cross-sectional size than a cross-sectional size of the outlet tube 70, such that the grounding layer 66 receives the outlet tube 70 therewithin. In one example, the grounding layer 66 is attached to the outlet tube 70, such as by brazing, welding, sealing, or the like.

The connecting assembly 39 further includes a sealing member 75. The sealing member 75 is an elastically deformable sealing structure that extends around the outlet tube 70 of the connector 40. In the shown example, the sealing member 75 has a shape that generally matches the shape of the outlet tube 70 and grounding layer 66 (e.g., circular shape). Of course, the sealing member 75 is not limited to such a shape, and in other examples, could include other cross-sectional shapes (e.g., square/quadrilateral shape, oval shape, etc.).

The sealing member 75 has an inner size (e.g., diameter) that substantially matches an outer size (e.g., diameter) of the outlet tube 70 and the grounding layer 66. In other examples, however, the sealing member 75 could be larger or smaller than as shown, provided that the sealing member 75 still forms a seal in a manner described below. The sealing member 75 is positioned adjacent the end surface 49 of the connector 40. As such, the sealing member 75 will abut the end surface 49 and the outlet tube 70 of the connector 40 and the grounding layer 66 of the second connector 60.

The connecting assembly 39 includes a fastener 80 for securing the sealing member 75 with respect to the connector 40 and second connector 60. The fastener 80 is an elongated body that is sized and shaped to attach to the connector 40. The fastener 80 extends between a first end 82 and an opposing second end 84. The fastener 80 can be longer or shorter than in the shown example. Similarly, the fastener 80 includes any number of shapes. For instance, while the fastener 80 includes a circularly shaped cross-section forming a cylindrical structure in this example, the fastener 80 could instead have a quadrilaterally shaped cross-sectional (e.g., square, rectangular, etc.), or other shapes.

The fastener 80 is substantially hollow and includes an internal bore 86. The internal bore 86 extends longitudinally from the first end 82 to the second end 84 of the fastener 80. The internal bore 86 is sized and shaped to receive the connector 40 therein. In particular, the internal bore 86 has a cross-sectional size that is slightly larger in size than the connector 40, such that the fastener 80 can receive the connector 40 during attachment. Similarly, the internal bore 86 has a cross-sectional shape (e.g., circular shape) that matches the circular shape of the connector 40.

Referring to the first end 82, the internal bore 86 includes a threaded portion 88. The threaded portion 88 extends at least partially along the length of the fastener 80 from the first end 82 towards the second end 84. The threaded portion 88 extends around the internal bore 86 such that the threaded portion 88 forms a female threading. The threaded portion 88 of the fastener 80 is sized and shaped to mate/engage with the threaded portion 50 at the outer surface 52 of the connector 40. In the shown example, the threaded portion 88 of the fastener 80 is mated with the threaded portion 50 of the connector 40, such that rotation of the fastener 80 and/or the connector 40 causes the fastener 80 to attach to the connector 40.

Referring now to the second end 84, the fastener 80 further includes a shoulder 94. The shoulder 94 projects inwardly towards the internal bore 86 and extends circumferentially around an inner surface of the fastener 80. As such, the shoulder 94 defines a reduced cross-sectional size (e.g., diameter) of the internal bore 86. The shoulder 94 defines an opening 96 positioned at the second end 84 which allows for the second connector 60 to pass through the fastener 80. The shoulder 94 can extend inwardly (e.g., towards the internal bore 86) a larger or smaller distance than as shown, and is not limited to the specific example of FIG. 2. The shoulder 94 is generally rounded (e.g., curved, smooth, etc.) so as to reduce abrasion against the sealing member 75. In particular, the shoulder 94 does not form a right angle or a relatively sharp corner to limit the likelihood of puncturing the sealing member 75.

The opening 96 is radially spaced apart from the grounding layer 66 of the second connector 60 and the outlet tube 70 of the connector 40. As such, the opening 96 has a larger cross-sectional size than a cross-sectional size of the grounding layer 66 and the outlet tube 70. An expansion opening 97 is formed between the grounding layer 66 at an inner radial location and the shoulder 94 at an outer radial location. In other examples, this expansion opening 97 could be radially larger or smaller and/or longitudinally longer or shorter than as shown. The expansion opening 97 allows for the sealing member 75 to elastically deform upon being compressed and expand into the expansion opening 97.

Referring still to FIG. 2, the operation of attaching the fastener 80 with respect to the connector 40 will now be described. Initially, as shown, the fastener 80 may be detached or only partially attached to the connector 40. The sealing member 75 is disposed between the fastener 80 and the connector 40. More specifically, the sealing member 75 is disposed between the shoulder 94 of the fastener 80 and the end surface 49 of the connector 40.

The connector 40 and sealing member 75 are each received within the internal bore 86 of the fastener 80 such that threaded portion 90 engages and mates with the threaded portion 50. The fastener 80 is rotated with respect to the connector 40 such that the fastener 80 is further threaded onto the connector 40.

Figure 3:
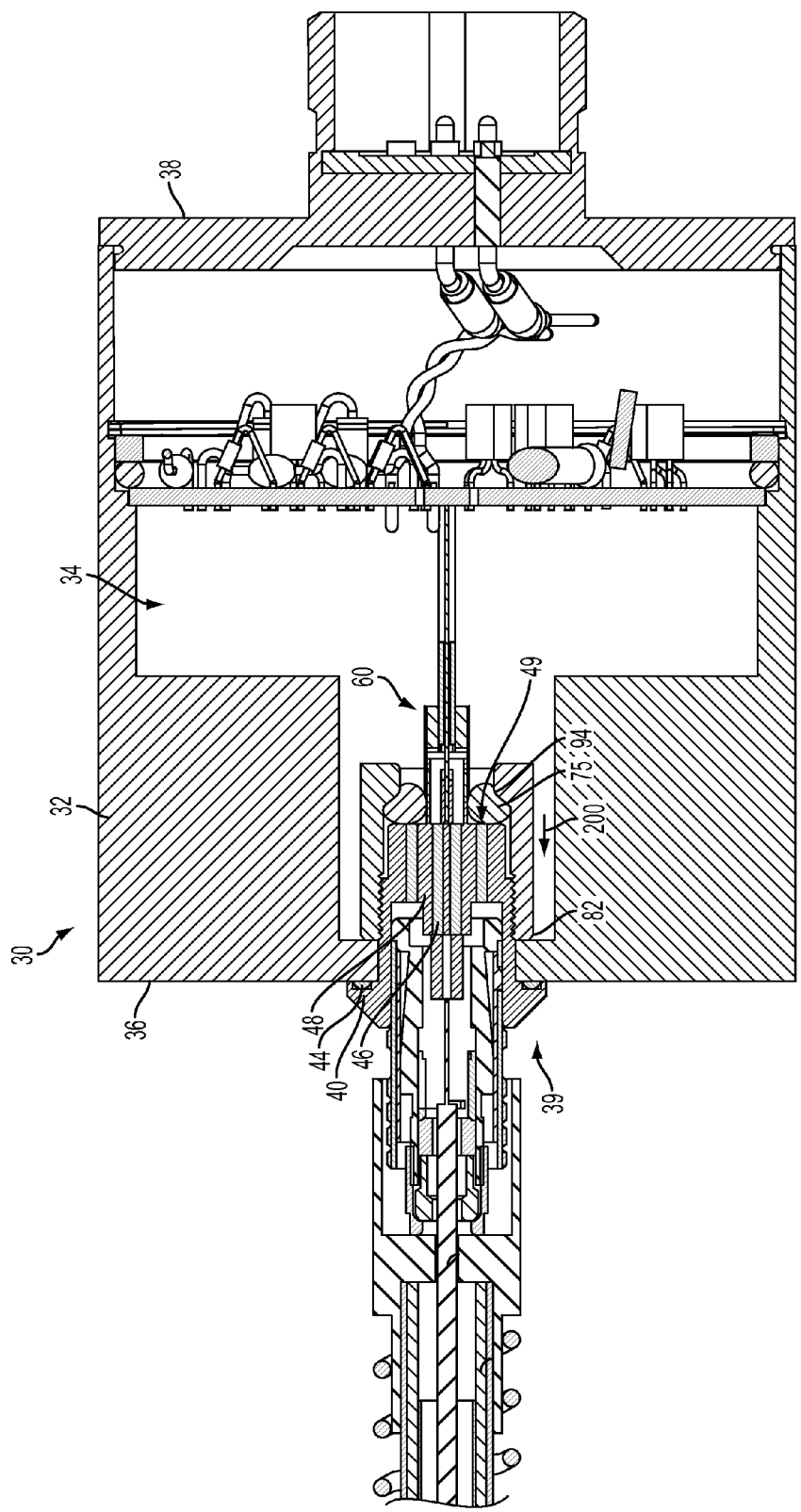
FIG. 3 is a view similar to FIG. 2 but with the connecting assembly fully attached with respect to the sensor housing.

Turning now to FIG. 3, the operation of attaching the fastener 80 with respect to the connector 40 is further shown. In this example, rotation of the fastener 80 will cause the fastener 80 to move along a first direction 200. Movement along the first direction 200 causes the fastener 80 to further thread onto and engage the connector 40. Eventually, the fastener 80 will be fully attached to the connector 40, as shown in FIG. 3, such that further movement along the first direction 200 is prevented. Full attachment of the fastener 80 to the connector 40 is realized when the first end 82 of the fastener 80 contacts and abuts a wall at the first end 36 of the sensor housing 30. This engagement between the fastener 80 and the sensor housing 30 limits further axial movement of the fastener 80 with respect to the connector 40.

With the fastener 80 fully attached to the connector 40, the sealing member 75 is compressed between the fastener 80 and the connector 40. In particular, the shoulder 94 will contact and compress the sealing member 75. As shown, the sealing member 75 is compressed into a sealing contact/engagement with the end surface 49 and the outlet tube 70. Accordingly, the sealing member will sealingly engage at least two separate locations of the connector 40: the end surface 49 and the outlet tube 70. This sealing contact will limit and/or prevent the passage of fluids through the connector 40.

In one example, the sensor housing 30 and connector 40 are exposed to a relatively wide range of temperatures, such as from about 25° Celsius (77° Fahrenheit) to about 150° Celsius (302° Fahrenheit). Further, the coefficients of thermal expansion between the potting layers 46 and grounding layers 48 are different. As such, at relatively elevated temperatures (e.g., 150° Celsius), the potting layers 46 and grounding layers 48 will exhibit different degrees of expansion, thus allowing for the possibility of fluids (e.g., air, gas, moisture, etc.) to pass through the interface between the potting layers 46 and grounding layers 48. However, due to the seal formed at the end surface 49 and the outlet tube 70 with the sealing member 75, the passage of fluids is limited/prevented.

The sealing member 75 will also sealingly contact the shoulder 94 of the fastener 80. Due to the shoulder 94 being generally rounded, contact between the sealing member 75 and the shoulder 94 will reduce damage to the sealing member 75 as compared to a relatively sharper corner. Additionally, due to the elevated temperatures that the sensor housing 30 will encounter, the sealing member 75 can expand with a reduced likelihood of degradation, rupture, etc. For example, the sealing member 75 is positioned adjacent the expansion opening 97. When the sealing member 75 is compressed and/or thermally expanded, the sealing member 75 will elastically deform and extend into the expansion opening 97.

Figure 4:
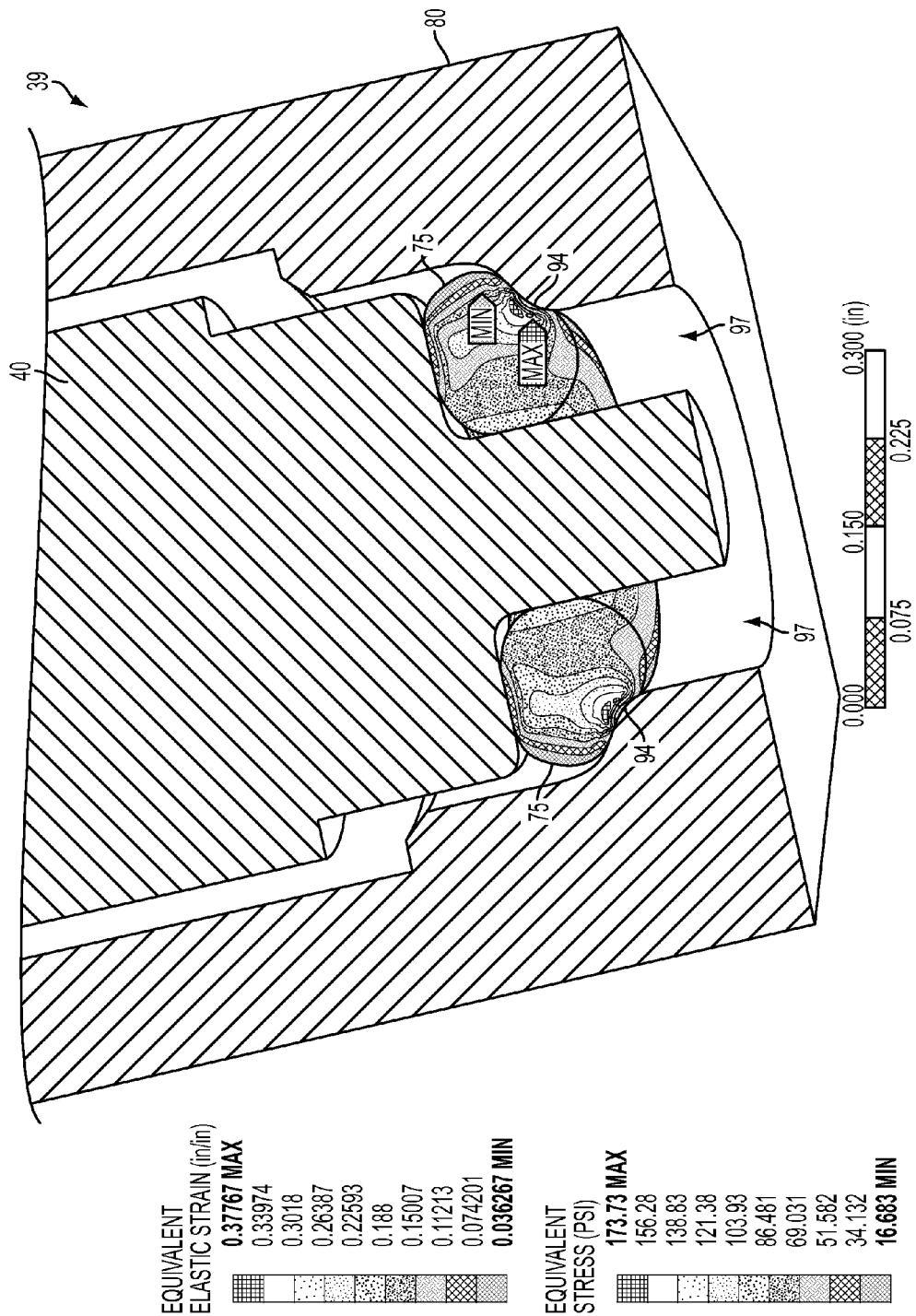
FIG. 4 is an enlarged and further schematized view of the connecting assembly depicting a range of strains and stresses within the sealing member when the connecting assembly is in the partially attached state.

Turning now to FIG. 4, an enlarged and further schematized sectional view of the connecting assembly 39 is shown. It is to be appreciated that the connector 40, etc. are schematized to permit focus upon the sealing member 75. It is further to be appreciated that the sectional view of the connecting assembly 39 does not specifically depict all internal parts/structure of the connecting assembly 39 for ease of illustration. Indeed, the wire lead 41, potting layers 46, grounding layers 48, etc. are not shown so as to more clearly focus on the sealing member 75. However, in operation, the sectional view of the connecting assembly 39 will look similar to the examples shown in FIGS. 2 and 3. As such, FIG. 4 is provided to show stress and strain within the sealing member 75.

In the depiction shown within FIG. 4, the fastener 80 is not fully attached to the connector 40. Rather, the fastener 80 is only partially attached to the connector 40 in a similar manner as shown in FIG. 2. As such, due to only the partial attachment between the fastener 80 and connector 40, the sealing member 75 is not fully compressed in FIG. 4.

As shown, the sealing member 75 will engage the connector 40 on one side and the shoulder 94 on an opposite side. In this shown example, the sealing member 75 is compressed approximately 0.86 centimeters (0.034 inches). Further, an elastic strain (in/in) of the sealing member 75 is relatively low, being approximately 0.377 at a maximum. Likewise, a stress (psi) of the sealing member 75 is also relatively low, approximately 173 psi. Further, the sealing member 75 experiences an adequate stress and strain adjacent in contact with the connector 40 so as to form a seal with the connector 40.

Figure 5:
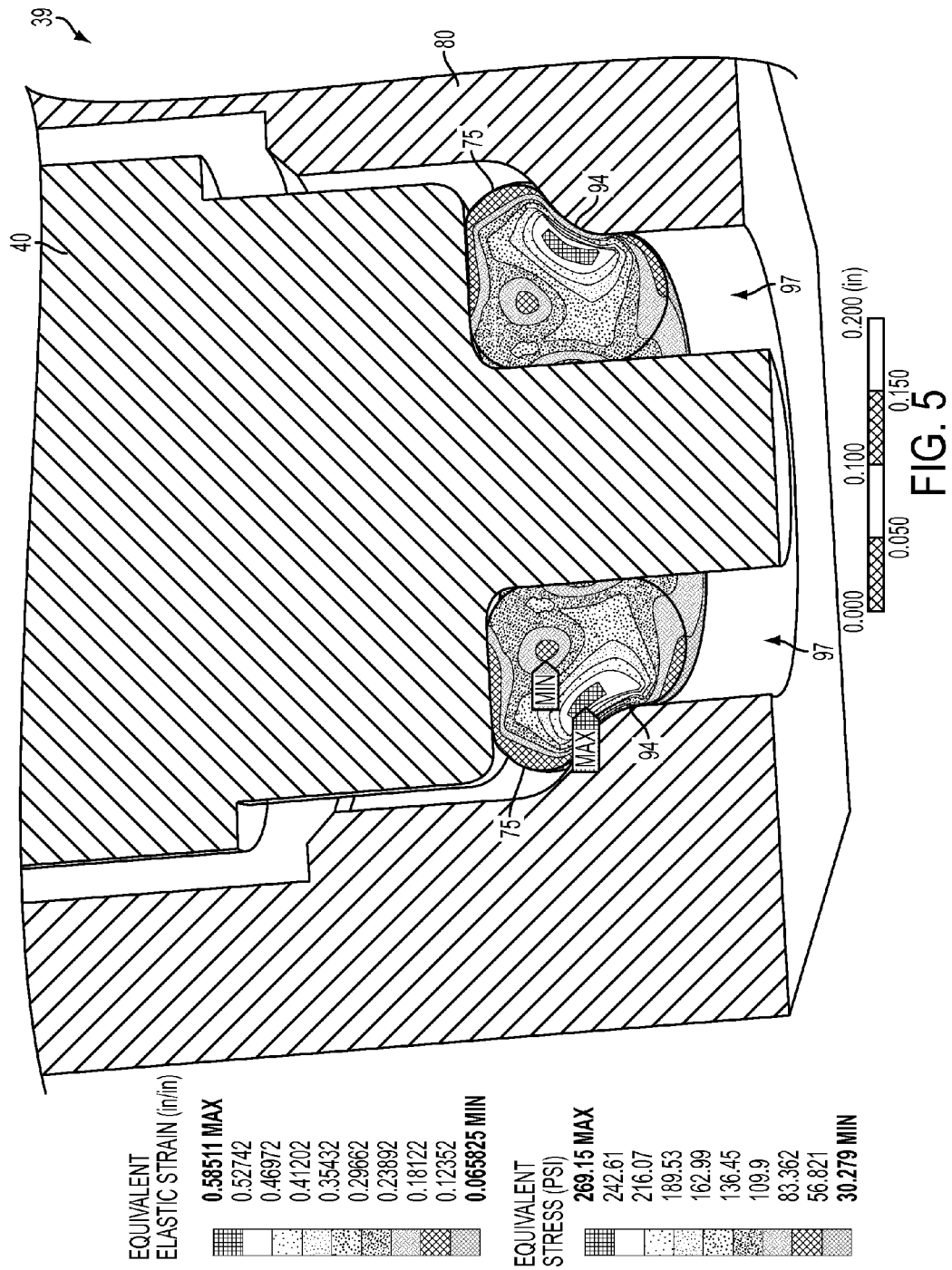
FIG. 5 is a view of the connecting assembly similar to FIG. 4, but depicting a range of strains and stresses within the sealing member when the connecting assembly is in the fully attached state at ambient temperature.

Turning now to FIG. 5, a second sectional view of the connecting assembly 39 is shown including the stress and the strain within the sealing member 75. In this example, the fastener 80 is fully attached to the connector 40 in a similar manner as shown in FIG. 3.

Additionally, in this example, the temperature experienced by the connecting assembly 39 is approximately room temperature (e.g., 20° C. or 68° F.).

As shown, the sealing member 75 is fully engaged with the connector 40 on one side and the shoulder 94 on an opposite side. In this example, the sealing member 75 forms a seal with the connector 40. An elastic strain of the sealing member 75 still remains relatively low, being approximately 0.585 at maximum. Likewise, a maximum stress of the sealing member 75 is also low, approximately 269 psi. In this particular example, the sealing member 75 has a maximum tensile stress of approximately 2100 psi. As such, the risk of rupture/breakage of the sealing member 75 due to excessive compressive forces is reduced. Additionally, the compression of the sealing member 75 causes the sealing member 75 to expand into the expansion opening 97, thus further limiting compressive forces on the sealing member 75.

Figure 6:
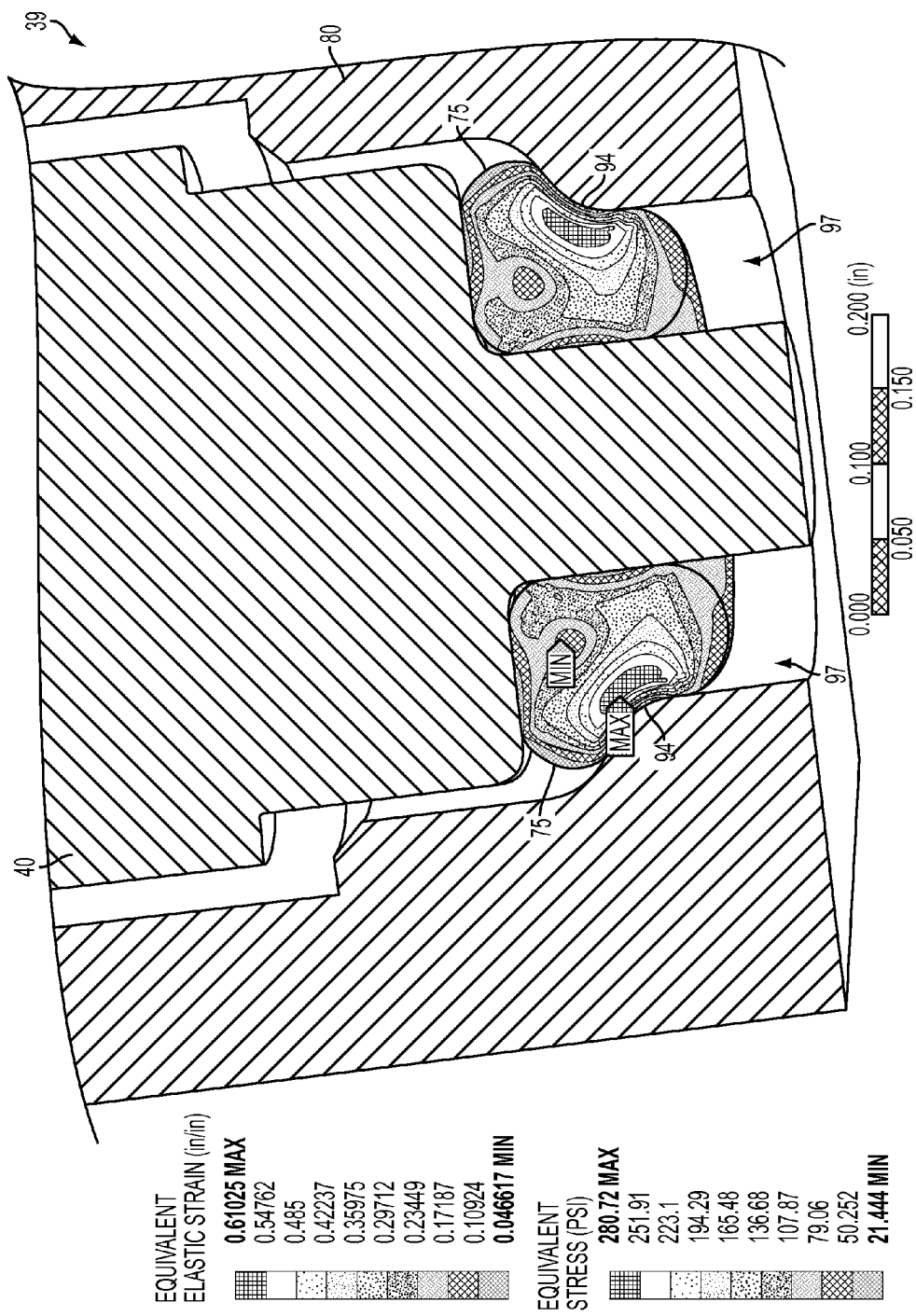
FIG. 6 is a view of the connecting assembly similar to FIG. 4, but depicting a range of strains and stresses within the sealing member when the connecting assembly is in the fully attached state at an elevated temperature.

Turning now to FIG. 6, a third sectional view of the connecting assembly 39 is shown including the stress and the strain within the sealing member 75. In this example, the fastener 80 is again fully attached to the connector 40 in a similar manner as shown in FIGS. 3 and 5. However, in this example, the temperature experienced by the connecting assembly 39 is elevated and is approximately 150° C. or 302° F. This elevated temperature can be in the range of a temperature that the connecting assembly 39 will experience during normal operation.

The sealing member 75 again forms a seal with the connector 40 while being positioned between the connector 40 on one side and the shoulder 94 on an opposite side. In this example, the elevated temperature will cause an increased stress and strain within the sealing member 75 as compared to the example shown in FIG. 5 due, at least in part, to thermal expansion. In particular, the connector 40, fastener 80, and sealing member 75 will each undergo at least some degree of thermal expansion.

As shown, even with thermal expansion occurring, the sealing member 75 will nonetheless exhibit a strain and stress lower than a maximum strain and stress. For instance, the maximum strain of the sealing member 75 remains relatively low, being approximately 0.610. Likewise, a maximum stress of the sealing member 75 is also low, approximately 280 psi. Again, the sealing member 75 has a maximum tensile stress of approximately 2100 psi. Accordingly, the risk of rupture/breakage of the sealing member 75 due to excessive compressive forces is reduced even at relatively elevated temperatures. Further, even if the temperature was higher than 150° C. or 302° F., further expansion of the sealing member 75 is accommodated for due to the expansion opening 97. In particular, if the sealing member 75 exhibits further compressive forces, the sealing member 75 will be able to elastically deform and extend into the expansion opening 97, thus relieving at least some of the strain/stress from the sealing member 75.

At least in view of the above description, the sealing member 75 will effectively seal the sensor housing 30 along a wide temperature range. In particular, the sealing member 75 will contact and form a seal with the connector 40. Further, by providing the generally rounded shoulder 94, the risk of rupture/breakage of the sealing member 75 is reduced. The sealing member 75 will also naturally deform/extend into the expansion opening 97 during periods of compression.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A sensor apparatus for sensing a condition, the sensor apparatus including:
 a sensor housing having a sealed internal chamber;
 a connector attached to the sensor housing and extending at least partially into the internal chamber of the sensor housing, the connector including an axial end surface located within the internal chamber;
 a fastener secured to the connector, the fastener including an internal bore that is sized to receive the connector with the end surface of the connector located within the internal bore of the fastener, the fastener including a should opposed to the end surface of the connector; and
 a sealing member positioned within the internal bore of the fastener and interposed between the end surface of the connector and the shoulder of the fastener, the sealing member being compressed by the shoulder of the fastener into a sealing engagement with the end surface of the connector to prevent fluid passage through the connector and into the internal chamber of the sensor housing.

2. The sensor apparatus of claim 1, wherein an end of the fastener contacts the sensor housing when the fastener is secured to the connector.

3. The sensor apparatus of claim 1, wherein the sealing member sealingly engages the connector at two separate locations of the connector.

4. The sensor apparatus of claim 1, wherein the shoulder is radially spaced apart from a portion of the connector to define an expansion opening.

5. The sensor apparatus of claim 4, wherein the sealing member is configured to elastically deform and extend into the expansion opening during compression of the sealing member.

6. The sensor apparatus of claim 5, wherein the shoulder is rounded and extends circumferentially around an inner surface of the fastener, the shoulder contacting the sealing member.

7. The sensor apparatus of claim 1, wherein the connector includes cater more portions.

8. The sensor apparatus of claim 1, wherein the connector is attached to an opening of the sensor housing, the connector is configured to transfer a signal indicative of the sensed condition into the sensor housing, and the sealing member is disposed between the connector and the fastener.

9. The sensor apparatus of claim 8, wherein the fastener includes an internal bore that extends from an end of the fastener towards an opposing second end.

10. The sensor apparatus of claim 9, wherein one of the ends of the fastener contacts the sensor housing when the fastener is fully attached to the connector.

11. The sensor apparatus of claim 10, wherein the scaling member is positioned within the internal bore of the fastener.

12. The sensor apparatus of claim 11, wherein the sealing member is compressed by the fastener to sealingly engage the connector.

13. The sensor apparatus of claim 8, wherein the sealing member sealingly engages the connector at two separate locations of the connector.

14. The sensor apparatus of claim 8, wherein the fastener includes a shoulder that is radially spaced apart from a portion of the connector to define an expansion opening.

15. The sensor apparatus of claim 14, wherein the sealing member is configured to elastically deform and extend into the expansion opening during compression of the sealing member.

16. The sensor apparatus of claim 15, wherein the shoulder is rounded and extends circumferentially around an inner surface of the fastener, the shoulder contacting the sealing member.

17. The sensor apparatus of claim 8, wherein the connector includes one or more portions.

18. A method of sealing a sensor apparatus, the method including the steps of:
providing a sensor housing having a sealed internal chamber;
positioning a connector to extend at least partially into the internal chamber of the sensor housing, including positioning the connector such that an axial end surface of the connector is located within the internal chamber;
attaching a fastener to the connector such that the connector is received within an internal bore of the fastener, such that the end surface of the connector is located within the internal bore of the fastener and such that a shoulder of the fastener is opposed to the end surface of the connector; and
compressing a sealing member that is positioned within the internal bore of the fastener and interposed between the shoulder of the fastener and the end surface of the connector such that the sealing member forms a seal with the connector and prevents fluid passage through the connector and into the internal chamber of the sensor housing.

19. The method of claim 18, wherein the shoulder is radially spaced apart from a portion of the connector to define an expansion opening.

20. The method of claim 19, wherein the sealing member extends into the expansion opening when the sealing member is compressed.

* * * * *

UNITED STATES PATENT AND TRADEMARK OFFICE
CERTIFICATE OF CORRECTION

| | | |
|---|---|---|
| PATENT NO. | : 9,188,463 B2 | Page 1 of 1 |
| APPLICATION NO. | : 13/759188 | |
| DATED | : November 17, 2015 | |
| INVENTOR(S) | : Benjamin John Olechnowicz et al. | |

It is certified that error appears in the above-identified patent and that said Letters Patent is hereby corrected as shown below:

In The Claims

Column 10, line 51, please delete "cater" and insert therefor --one or--.

Signed and Sealed this
Fifteenth Day of March, 2016

Michelle K. Lee
*Director of the United States Patent and Trademark Office*